US009882445B2

(12) United States Patent
Coldwate et al.

(10) Patent No.: US 9,882,445 B2
(45) Date of Patent: Jan. 30, 2018

(54) PHASE SEPARATORS FOR ELECTRIC MACHINES

(71) Applicant: Hamilton Sundstrand Corporation, Charlotte, NC (US)

(72) Inventors: Joseph K. Coldwate, Roscoe, IL (US); Wilfredo E. Colón-Velázquez, South Beloit, IL (US); Gordon W. Friske, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 620 days.

(21) Appl. No.: 14/517,341

(22) Filed: Oct. 17, 2014

(65) Prior Publication Data

US 2016/0111932 A1    Apr. 21, 2016

(51) Int. Cl.
*H02K 3/34* (2006.01)
*H02K 3/38* (2006.01)

(52) U.S. Cl.
CPC ................ *H02K 3/34* (2013.01); *H02K 3/38* (2013.01)

(58) Field of Classification Search
CPC .................................... H02K 3/38; H02K 3/34
USPC ................................................... 310/214, 215
See application file for complete search history.

(56) References Cited

U.S. PATENT DOCUMENTS

| 3,109,947 | A | | 11/1963 | Thompson et al. | |
|---|---|---|---|---|---|
| 3,575,623 | A | * | 4/1971 | Stine | H02K 3/50 310/215 |
| 3,857,171 | A | | 12/1974 | Lund | |
| 3,909,648 | A | * | 9/1975 | Clark | H02K 3/38 310/192 |
| 4,090,290 | A | | 5/1978 | Clark | |
| 4,335,325 | A | * | 6/1982 | Miller | H02K 3/38 310/214 |
| 4,389,584 | A | | 6/1983 | Burns | |
| 4,403,162 | A | * | 9/1983 | Pallaro | H02K 3/38 310/194 |
| 4,507,580 | A | * | 3/1985 | Obara | H02K 3/38 29/596 |
| 5,093,543 | A | * | 3/1992 | Patton | H02K 3/38 174/138 E |

(Continued)

FOREIGN PATENT DOCUMENTS

| DE | 947916 C | 8/1956 |
|---|---|---|
| GB | 2088648 A | 6/1982 |

(Continued)

OTHER PUBLICATIONS

European Search Report dated Jun. 21, 2016, received from the European Patent Office for Application No. EP15190095.

(Continued)

*Primary Examiner* — Naishadh Desai
(74) *Attorney, Agent, or Firm* — Locke Lord LLP; Scott D. Wofsy; Christopher J. Cillié

(57) ABSTRACT

A phase separator for an electric machine includes a first insulator and a second insulator. The first and second insulators each include a leg portion and an endturn portion connected to the leg portion. The endturn portion is asymmetric with respect to an axis defined by the leg portion such that the second insulator can be inverted and disposed in an overlapping arrangement for electrically insulating endturn portions of adjacent phase windings.

16 Claims, 5 Drawing Sheets

(56) References Cited

U.S. PATENT DOCUMENTS 5,659,219 A * 8/1997 Momose ............... H02K 3/38
                                                                 29/596
6,043,584 A * 3/2000 DeHart ................ H02K 3/38
                                                                  310/194
2014/0175937 A1    6/2014 Coldwate et al.

FOREIGN PATENT DOCUMENTS

GB          2122426 A     1/1984
WO    WO-2013138901 A1   9/2013

OTHER PUBLICATIONS

Extended European Search Report from the European Patent Office dated Jun. 28, 2016 for Application No. EP 14184269.

* cited by examiner

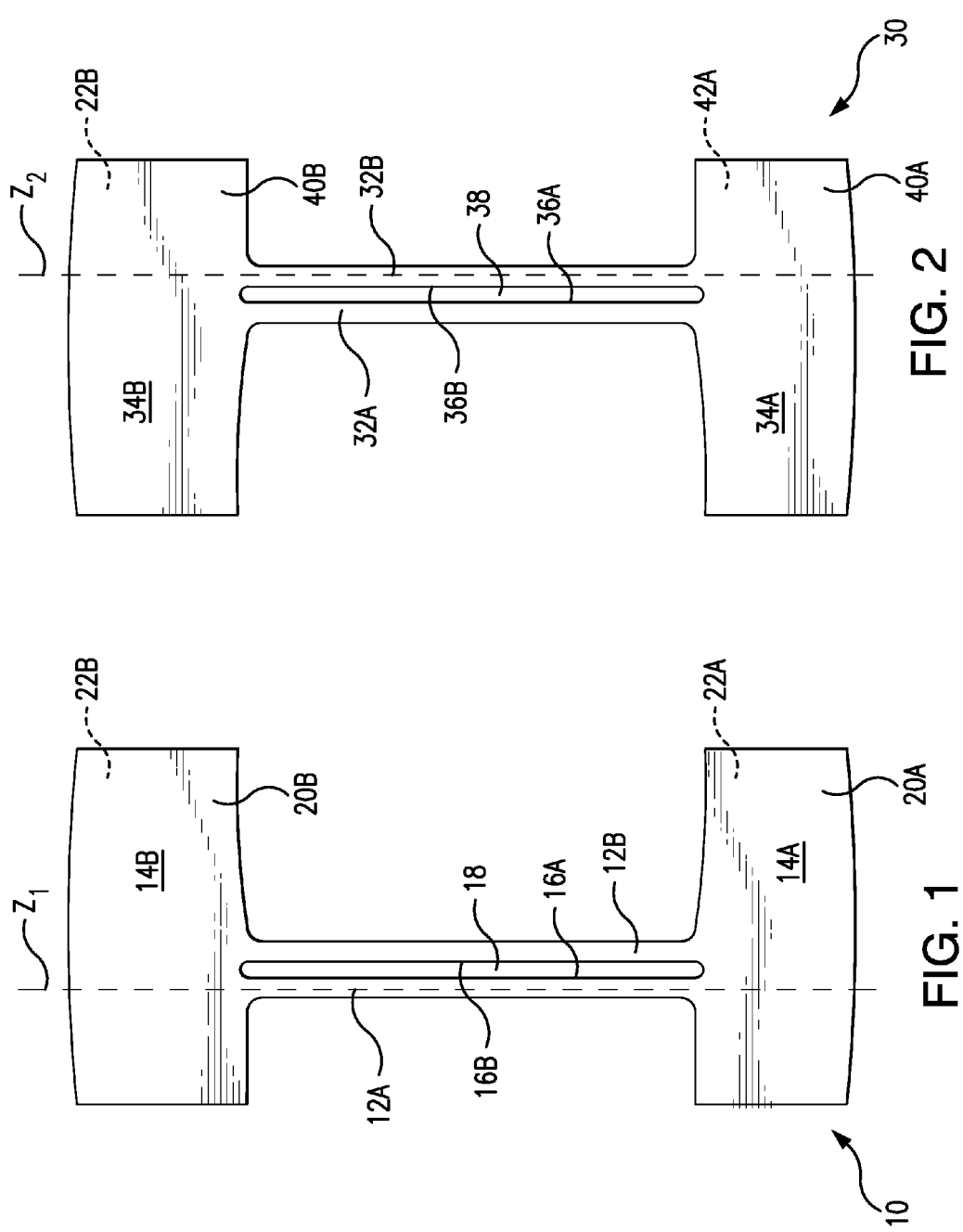

PHASE SEPARATORS FOR ELECTRIC MACHINES

BACKGROUND OF THE INVENTION

1. Field of the Invention

The present disclosure relates to electric machines, and more particularly to stator assemblies for electric machines.

2. Description of Related Art

Electric machines typically include a rotatable rotor and a stationary stator. The stator commonly includes a plurality of windings. In electric motors, the stator windings receive electrical energy that generates a rotating magnetic field. The rotating magnetic field interacts with the rotor to generate mechanical energy. In electric generators, mechanical energy supplied to a rotor causes a magnetic field generated by the rotor to rotate and interact with the stator windings to generate electric energy. In rotating transformers, electrical energy applied to windings on the rotor or windings with a first phase generates a magnetic field. The magnetic field induces an output current flow in windings in the other of the rotor and stator having a phase different that that input to the transformer. The stator typically includes a plurality of phase windings, e.g. two-phase or three-phase, for either receiving multiphase input alternating current (AC) power in motoring applications or for providing multiphase output AC power in generating applications. In both electric motor and electric generator applications, the windings typically include an insulating material disposed between adjacent phase windings to electrically insulate the phase windings from one another.

Such conventional systems and methods have generally been considered satisfactory for their intended purpose. However, there is still a need in the art for improved electrical insulation between electric machine windings. The present disclosure provides a solution for this need.

SUMMARY OF THE INVENTION

A phase separator for an electric machine includes a first insulator and a second insulator. The first and second insulators each include a leg portion and an endturn portion connected to the leg portion. The endturn portion is asymmetric with respect the leg portion for electrically insulating endturn portions of adjacent phase windings.

In certain embodiments, each insulator includes an electrically insulating material such as paper, laminate, polymeric film, or any other suitable material. The leg portion can be a first leg portion and a second support leg can be connected to the end portion. The first leg portion can have a lateral edge and the second leg portion can have a lateral edge facing the lateral edge of the first leg portion. The lateral edges can define therebetween a stator tooth slot. The stator tooth slot can be configured and adapted to fix the insulator in a stator core of an electric machine. It is contemplated that the stator tooth slot can be configured and adapted to receive a single tooth of a stator core of an electric machine.

In accordance with certain embodiments the endturn portion includes a positioning tab defined on an edge intersecting the support leg. The endturn portion can be a first endturn portion and the insulator can include a second end portion connected to an end of the leg portion opposite the first endturn portion. The positioning tab can be disposed on the first endturn portion, and the second endturn portion can define a positioning tab axially opposite the positioning tab of the first endturn portion.

It is contemplated that in accordance with certain embodiments the endturn portion is asymmetric with respect to an axis defined by the leg portion. The second insulator can be inverted with respect to the first insulator. A portion of the second insulator can overlap the first insulator for providing electrical insulation between adjacent endturn windings in a plurality of positions with respect to one another.

A stator assembly for an electric machine includes a stator core, first and second phase windings, and two-piece phase separator as described above. The stator core has a plurality of stator teeth extending radially inward from the stator core that define therebetween a plurality of stator slots for receiving portions of the first and second phase windings. The first phase winding has windings located in a first plurality of the stator slots and has endturn portions extending beyond the stator core. The second phase winding has windings located in a second plurality of stator slots and has endturn portions extending beyond the stator core and adjacent the endturn portions of the first phase windings. The leg portions of the two-piece phase separator are in one of the plurality of stator slots and the end separates the adjacent endturn portions of the first and second phase windings such that each is electrically insulated from the other.

In certain embodiments a portion of the endturn portion of the second insulator overlaps the endturn portion of the first insulator. The second insulator can be inverted with respective to the first insulator such that the asymmetric insulators form a symmetric two-piece phase separator. It is contemplated that the positioning tab can be oriented toward the stator core end.

In accordance with certain embodiments, the stator assembly can include a third phase winding having windings located in a third plurality of stator slots. The third phase winding can have endturn portions extending beyond the stator core and endturn portions of a second two-piece phase separator as described above can be disposed between the second phase winding endturn portion and the third winding endturn portion, thereby electrically insulating the second phase winding from the third endturn winding. It is contemplated that endturn portions of a third two-piece phase separator can separate endturn portions of the third phase winding from endturn portions of the first phase winding.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a plan view of a first insulator for exemplary embodiment of a phase separator, showing the outer surfaces of leg and endturn portions of the first insulator;

FIG. 2 is a plan view of a second insulator for exemplary embodiment of the phase separator, showing the outer surfaces of leg and endturn portions of the second insulator;

DETAILED DESCRIPTION OF THE PREFERRED EMBODIMENTS

Figure 3:
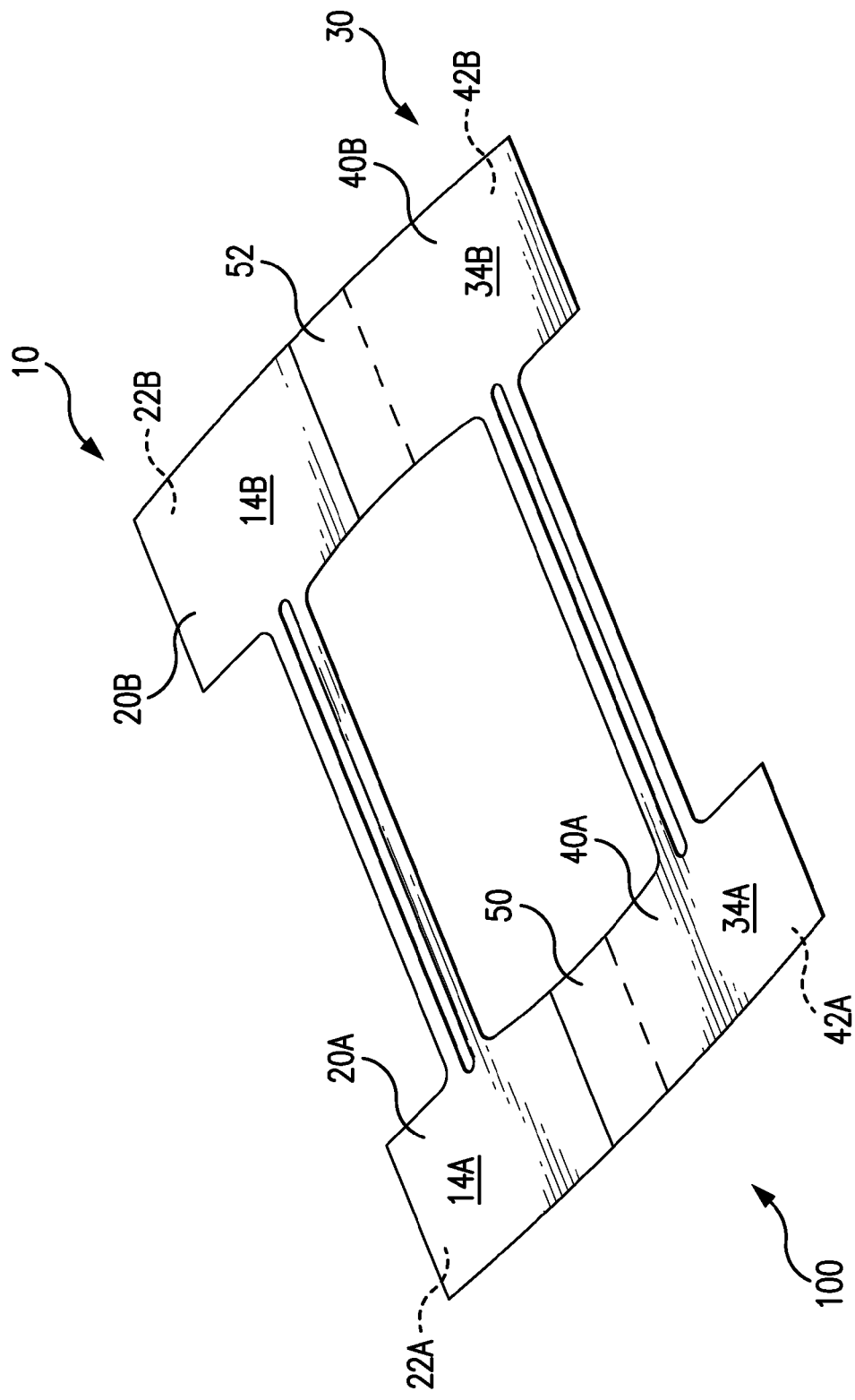
FIG. 3 is a perspective view of phase separator including the first and second insulators of FIG. 1 and FIG. 2, showing overlapping endturn portions of the first and second insulators.

Reference will now be made to the drawings wherein like reference numerals identify similar structural features or aspects of the subject disclosure. For purposes of explanation and illustration, and not limitation, a two-piece phase separator constructed in accordance with the disclosure is shown in FIG. 3 and is designated generally by reference character 100. Other embodiments of phase separators in accordance with the disclosure, or aspects thereof, are provided in FIGS. 1, 2, 4 and 5, as will be described. The systems and methods described herein can be used electric machines such as motors, generators or transformers for aircraft electrical systems.

FIG. 1 is a plan view for a first insulator 10 for a two-piece phase separator 100 (shown in FIG. 3). First insulator 10 includes a first leg portion 12A, a second leg portion 12B, a first endturn portion 14A, and a second endturn portion 14B. First leg portion 12A is connected to first endturn portion 14A and second endturn portion 14B. Second leg portion 12B is connected to first endturn portion 14A and second endturn portion 14B. First endturn portion 14A is located opposite second endturn portion 14B such that first leg portion 12A and second leg portion 12B extend between first endturn portion 14A and second endturn portion 14B.

First leg portion 12A has a lateral edge 16A. Second leg portion 12B has a lateral edge 16B facing lateral edge 16A of first leg portion 12A. Lateral edge 16A and lateral edge 16B define therebetween a stator tooth slot 18. Stator tooth slot 18 is configured and adapted to fix first insulator 10 axially within a stator core 202 (shown in FIG. 4) of an electric machine. This seats first leg portion 12A and second leg portion 12B within stator core 202 (shown in FIG. 4) and positions first endturn portion 14A and second endturn portion 14B beyond axially opposite ends of stator core 202.

First endturn portion 14A includes an outer surface 20A and an inner surface 22A opposite outer surface 20A. Second endturn portion 14B includes an outer surface 20B and an inner surface 22B opposite outer surface 20B. First endturn portion 14A and second endturn portion 14B are both asymmetric with respect a first insulator axis $Z_1$ defined by first leg portion 12A that divides first insulator 10 into a left-hand side and adjacent right-hand side (relative to the top of FIG. 1). Relative to the left-hand side and right-hand side of FIG. 1, first insulator axis $Z_1$ divides areas of first end turn portion 14A and second endturn portion 14B into left-hand and right-hand sides where areas of the right-hand sides of first endturn portion 14A and second endturn portion 14B are greater than respective areas of the left-hand sides of first endturn portion 14A and second endturn portion 14B.

First insulator 10 includes an electrically insulating material such as Nomex® and Kapton®, available from E.I. du Pont Nemours and Company of Wilmington, Del. The electrically insulating material can be incorporated into paper, laminate, polymeric film, or any other structure for incorporation into an electric machine.

With reference to FIG. 2, a second insulator 30 of two-piece phase separator 100 is shown. Second insulator 30 is similar to first insulator 10 (shown in FIG. 1), and in the illustrated exemplary embodiment is similar in construction but is in an inverted orientation with respect to first insulator 10 (shown in FIG. 1) when installed in stator core 202 (shown in FIG. 4). Second insulator 30 includes a third leg portion 32A, a fourth leg portion 32B, a third endturn portion 34A, and a fourth endturn portion 34B. Third leg portion 32A is connected to third endturn portion 34A and fourth endturn portion 34B. Fourth leg portion 32B is connected to third endturn portion 34A and fourth endturn portion 34B. Third endturn portion 34A is located opposite fourth endturn portion 34B such that third leg portion 32A and fourth leg portion 32B extend between each of third endturn portion 34A and fourth endturn portion 34B.

Third leg portion 32A has a lateral edge 36A. Fourth leg portion 32B has a lateral edge 36B facing lateral edge 36A. Lateral edge 36A and lateral edge 36B define therebetween a second stator tooth slot 38. Second stator tooth slot 38 is configured and adapted to fix second insulator 30 axially within a stator core 202 (shown in FIG. 4) of an electric machine such third leg portion 32A and fourth leg portion 32B are seated within stator core 2020 with third endturn portion 34A and fourth endturn portion 34B extending beyond axially opposite ends of stator core 202.

Third endturn portion 34A includes an outer surface 40A and an inner surface 42A opposite outer surface 40A. Fourth endturn portion 34B includes an outer surface 40B and an inner surface 42B opposite outer surface 40B. Third endturn portion 34A and fourth endturn portion 34B are both asymmetric with respect a second insulator axis Z2 defined by fourth leg portion 32B that divides second insulator 30 into a left-hand side and adjacent right-hand side (relative to the top of FIG. 2). Relative to the left-hand side and right-hand side of FIG. 2, second insulator axis Z2 divides areas of third endturn portion 34A and fourth endturn portion 34B into left-hand and right-hand sides where areas of the left-hand sides of third endturn portion 34A and fourth endturn portion 34B are greater than respective areas of the right-hand sides of third endturn portion 34A and fourth endturn portion 34B. In this respect, second insulator 30 mirrors first insulator 10 (shown in FIG. 1) about a phase separator axis Z (shown in FIG. 3) extending between the insulators when overlapping one another.

With reference to FIG. 3, two-piece phase separator 100 is shown in an overlapped arrangement. It is to be understood and appreciated that the illustrated overlapping arrangement is a simplified illustration of the arrangement adopted by two-piece phase separator 100 when integrated into stator assembly 200 (shown in FIG. 4). Second insulator 30 overlaps first insulator 10 such that at least a portion of second insulator 30 overlays a portion 50 of first insulator 10. A portion 52 of second end portion 14B slideably overlays second insulator fourth endturn portion 34B, also forming an adjustable joint that can accommodate movement between first insulator 10 and second insulator 30.

Portions 50 and 52 are sized such that second insulator 30 overlaps first insulator 10 in a plurality of winding endturn portion position, such as when the winding endturn portions are radially spread during manufacture during insertion of winding coils into the stator core. Overlaying insulator portion 50 is slideably disposed over the underlying insulator portion. This allows adjustment and/or repositioning of the insulators with respect to one another, thereby forming an adjustable joint that can accommodate movement of endturn portions of first insulator 10 with respect to second insulator 30 during assembly of stator core 202 (shown in FIG. 4). It is to be understood and appreciated that illustrated arrangement is exemplary and that in accordance with other embodiments only one endturn portion of second insulator 30 can overlap first insulator 10. In certain embodiments, a portion or portions of first insulator 10 can overlap second insulator 30.

Figure 4:
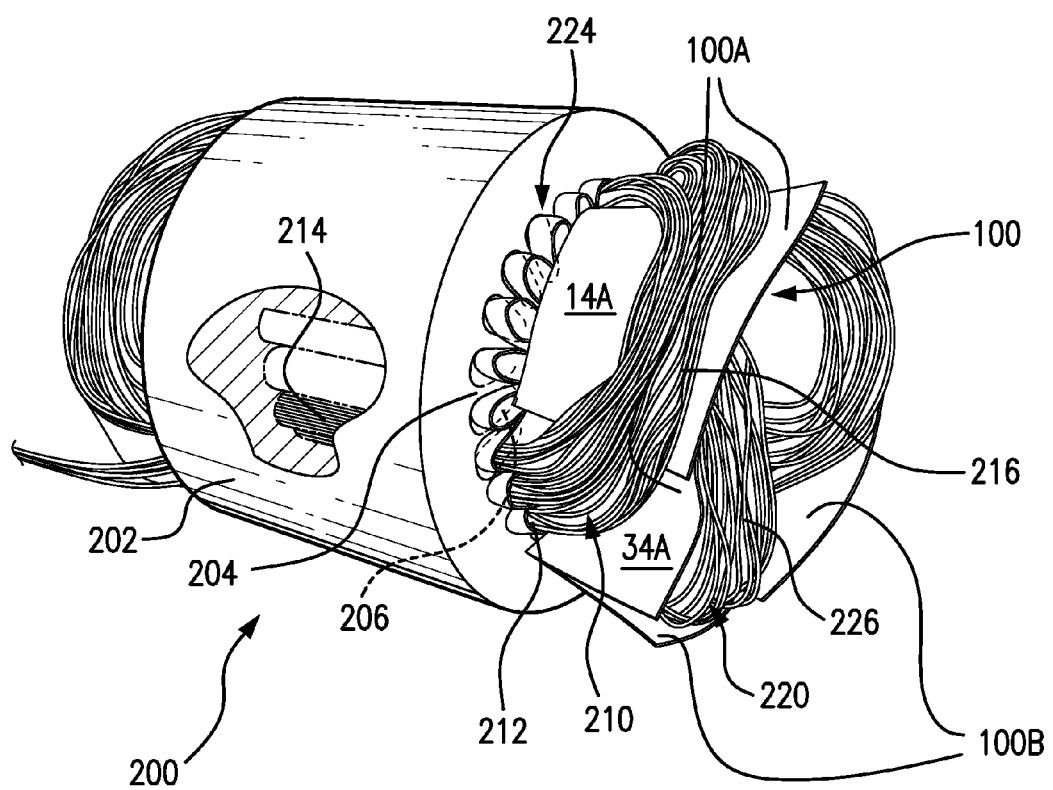
FIG. 4 is a perspective view of an end of an electric machine including the two-phase phase separator of FIG. 3, showing overlapping endturn portions of the two-piece phase separators insulating respective endturn portions of adjacent phase windings.

With reference to FIG. 4, a stator assembly 200 for an electric machine having a phase down concentric construction stator is shown. Stator assembly 200 includes a stator core 202, a plurality of phase windings, and a plurality of two-piece phase separators 100. With respect to the plurality of phase windings, stator assembly 200 is a three-phase stator assembly and includes a first phase winding 210, a second phase winding 220, and a third phase winding 230. Although illustrated as a three-phase stator assembly in the exemplary embodiment, it is to understood and appreciated that embodiments of phase separators described herein are also suitable for electric machines with fewer or more phases, such as two-phase electric machines or electric machines with four or more phases.

Figure 5:
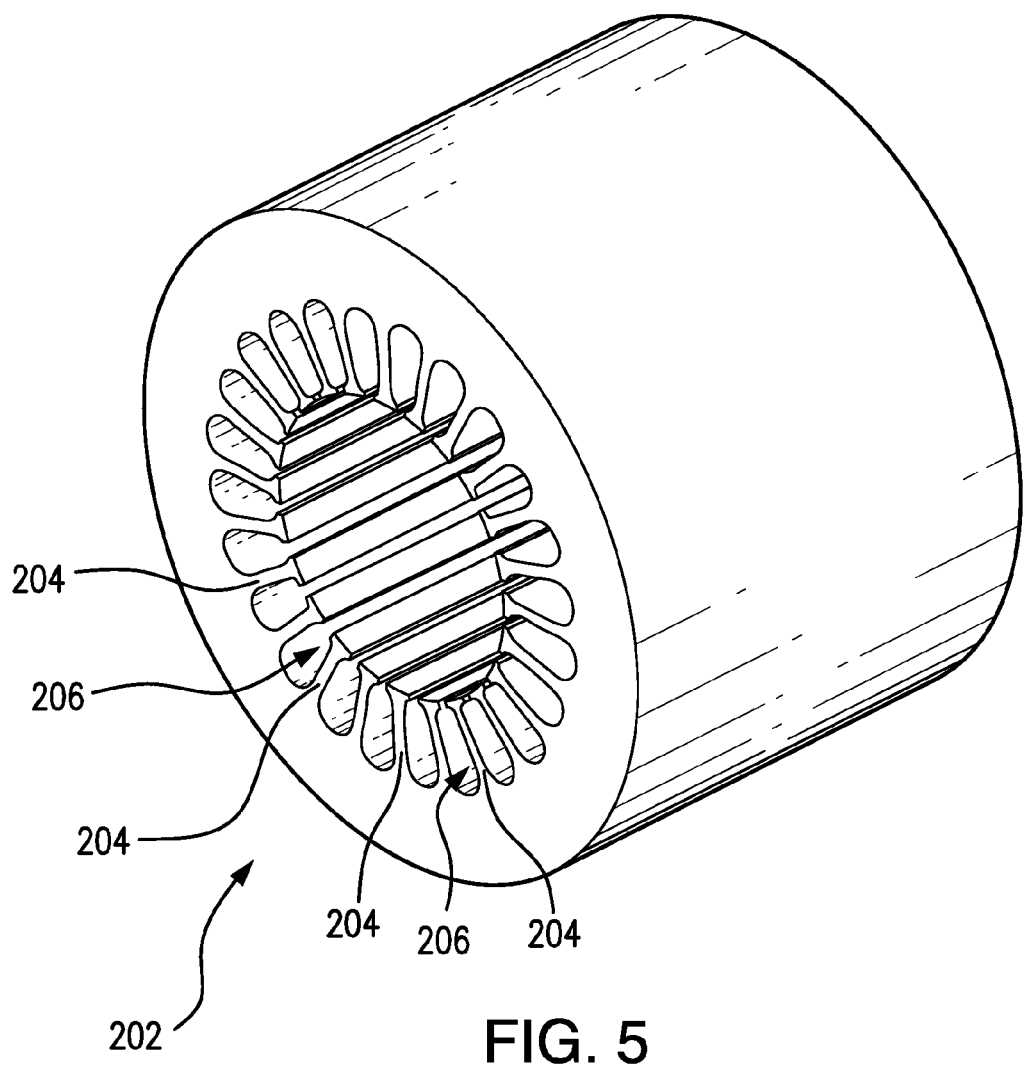
FIG. 5 is a perspective view of the stator core of the electric machine shown in FIG. 4, showing stator teeth and stator core slots.
Figure 6:
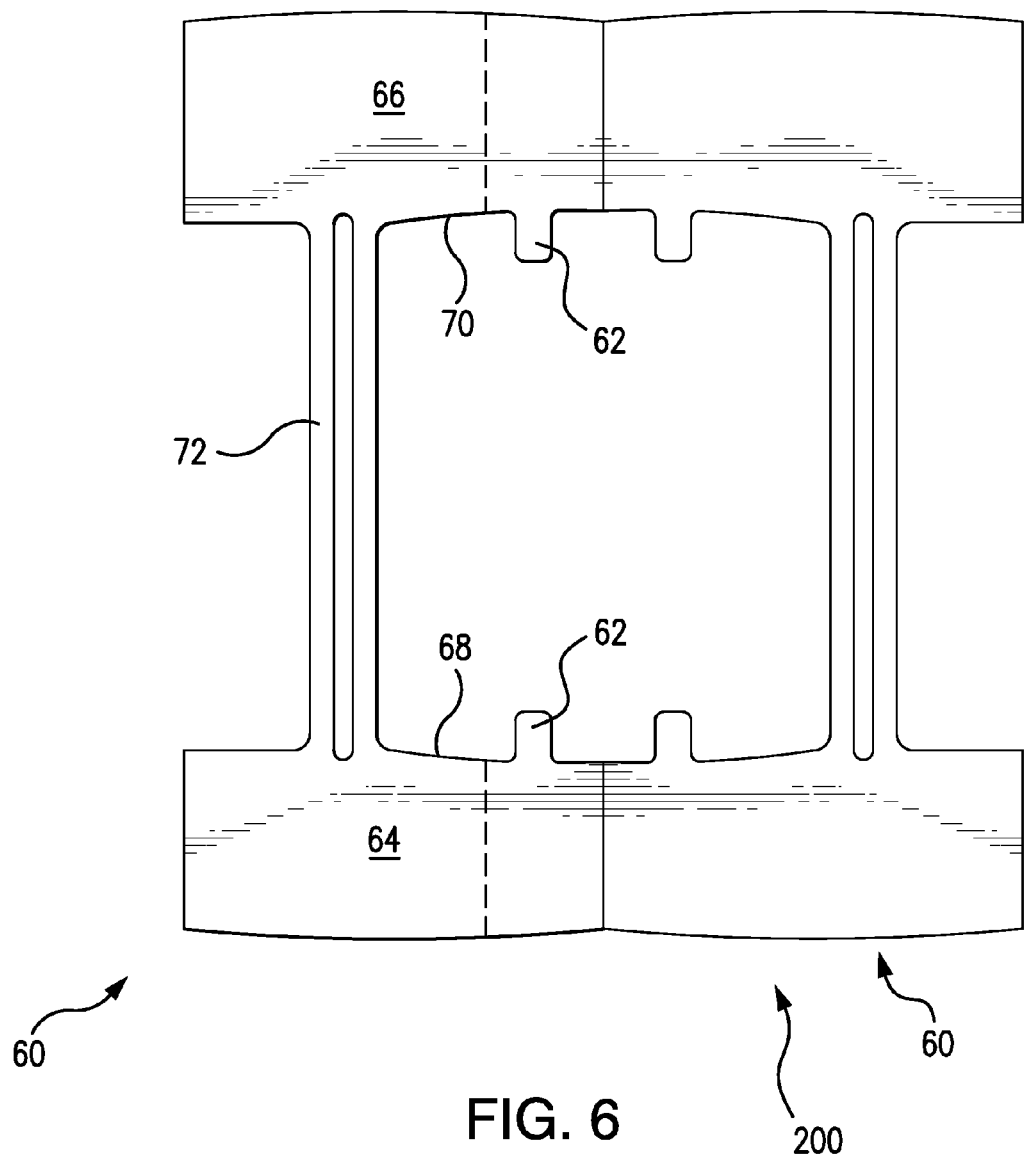
FIG. 6 is a plan view of another embodiment of a portion of a two-piece phase separator, showing an insulator having a positioning tab disposed on the endturn portion of the insulator.

With reference to FIG. 5, stator core 202 is shown. Stator core 202 includes a plurality of stator core teeth 204 extending radially inward from stator core 202. Circumferentially adjacent stator core teeth 204 define therebetween stator slots 206 for seating leg portions of two-piece phase separator 100 (shown in FIG. 1).

With continued reference to FIG. 4, two-piece phase separator 100 and portions of the windings, i.e. axially extending portions of first phase winding 210, second phase winding 220, and third phase winding 230, seat within core 202. In this respect, first phase winding 210 has axially-extending winding portions 212 located in a first plurality of the stator slots 214 and endturn portions 216 extending beyond stator core 202. Second phase winding 220 has axial-extending winding portions (not shown for clarity reasons) located in a second plurality of the stator slots 224 and endturn portions 226 extending beyond stator core 202. It is to be understood and appreciated that a third phase winding can be included also having axially-extending winding portions (not shown for clarity reasons) located in a third plurality of the stator slots and having endturn portions (not shown for clarity reasons) extending beyond stator core 202.

A plurality of pairs of phase separators 100A and 100B electrically insulate first phase windings 210 from second phase windings 220. First endturn portion 14A and third endturn portion 34A cooperatively separate first phase winding endturn portion 216 from second phase winding endturn portion 226, thereby providing electrical insulation between endturn portion 216 and endturn portion 226. Endturn portions of insulators of a second two-piece insulator 100 similarly separate second phase winding endturn portion 226 from third phase winding endturn portion 236. Endturn portions of insulators of a third two-piece insulator (not shown for clarity purposes) further separate third phase winding endturn portion 236 from first phase winding endturn 236.

With reference to FIG. 5, another embodiment of phase separator 200 is shown. Phase separator 200 is similar to phase separator 100 and additionally an insulator 60. Insulator 60 is similar to first insulator 10 (shown in FIG. 1) and second insulator 30 (shown in FIG. 2) and additionally includes a plurality of positioning tabs 62. Positioning tabs 62 are respectively arranged on opposing first endturn portion 64 and second endturn portion 66 on an edge 68 facing and an edge 70. Edge 68 and edge 70 both intersect support leg 72. As illustrated, positioning tabs 62 are arranged axially opposite to one another such that, in an installed configuration, each face stator core 202. This makes positioning tabs 62 accessible during motor assembly when winding endturn portions separated by first endturn portion 64 and/or second endturn portion 66 can be displaced during the spreading or lacing operations, potentially reducing the insulating effectiveness of the insulator endturn and winding endturn portion arrangement.

Positioning tabs 62 are located on axially inward facing edges of two-piece phase separator 100 (as illustrated in FIG. 3) because, in some assembly operations, either or both first insulator 10 and second insulator 30 can raise up and away from stator core 202 (shown in FIG. 4) when winding endturn portions are moved radially outward from the stator core, such as when a rotor is inserted into the stator core. In such event positioning tabs 62 can provide a mechanism that allows for re-positioning insulator endturn portions 64 and 66 between the winding endturn portions, potentially simplifying assembly by avoiding more extensive (or disruptive) rework of the electric machine.

Multiphase electric machines commonly include wire bundles associated with each phase of the electric machines. Precut separators formed from electrically insulating material such as paper, laminate, or polymeric film as described herein can prevent wires from one phase from coming into contact with wires of another phase. During assembly of the some types of electric machines, like certain types of aircraft air handling system motors, endturns of the wire bundles are manipulated by being displaced radially outward such that the motor rotor can be inserted into the stator core. The endturns may also be manipulated during a lacing operation wherein the endturns are secured to opposite ends of the core. Such manipulation of the endturn portions can cause portions of conventional phase separators to shift from between the adjacent endturn bundles, potentially reducing the reliability of the electric machines. This can be particularly challenging in electric machines having phase separators spanning a relatively large portion of the machine circumference, such as on two-phase motors for example.

Embodiments of the two-piece phase separators described herein have insulators with respective leg portions extending between axially opposed insulator endturn portions. The leg portions seats within the stator core, fixing the insulator axially within the core and limiting movement of the insulator axially while windings are installed in the core.

Embodiments of two-piece phase separators described herein include first and second insulators with endturn portions that slideably overlap one another. This allows the insulators to cooperate as a pair in accommodating movement of the winding endturn portions by providing electrical insulation in a plurality of winding endturn position. As the winding endturn portions are mechanically manipulated during the assembly process, the amount of overlap between the endturn portions can change in concert with the movement of the winding endturn portions. This can provide electrical separation between the endturn winding portions in a plurality of positions, such as an unspread, spread, and/or laced electric machine stator configuration. In the event that slideable joint lacks sufficient travel to accommodate the operation, positioning tabs arranged on the endturn portions of the phase separators allow for repositioning of the insulator endturn portion, thereby proving an adjustment mechanism for repositioning an insulator endturn portion in the event that repositioning of a respective endturn portion becomes necessary. This can improve the reliability of electric machines including the phase separators as the stator assemblies of such machines have more robust electrical insulation between the winding endturn portions, and therefore can be less likely to experience electrical stresses, voltage spikes, or corona during operation of the electric machine.

The methods and systems of the present disclosure, as described above and shown in the drawings, provide for phase separator assemblies with superior properties including contiguous insulating surfaces in a plurality of insulating body end segment positions. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A phase separator for an electric machine, comprising:
   separate first and second insulators, each insulator including:
      a leg portion; and
      an endturn portion connected to the leg portion, wherein the endturn portion is asymmetric with respect to an insulator axis extending along the leg portion relative to a rotation axis of the electrical machine for electrically insulating adjacent phase winding endturn portions,
   wherein the first insulator has an overlaying insulator portion,
   wherein the second insulator has an underlying insulator portion, and
   wherein the underling insulator portion is between the insulator leg portions and is in sliding engagement with the overlaying insulator portion to accommodate movement between the first insulator and the second insulator.

2. The phase separator as recited in claim 1, wherein the endturn portion includes a positioning tab defined on an edge of the endturn portion intersecting the leg portion.

3. The phase separator as recited in claim 1, wherein the insulator comprises a material selected from the group including paper, laminate, and polymeric film.

4. The phase separator as recited in claim 1, wherein the leg portion is a first leg portion and further including a second leg portion connected to the endturn portion.

5. The phase separator as recited in claim 4, wherein adjacent lateral edges of the first leg portion and the second leg portion define therebetween a stator tooth slot.

6. The phase separator as recited in claim 1, wherein the endturn portion is a first endturn portion, and further including a second endturn portion connected to the leg portion opposite the first endturn portion.

7. A stator assembly, comprising:
   a stator core having a plurality of stator teeth extending radially inward from the stator core, the plurality of stator teeth defining a plurality of stator slots for receiving phase windings;
   a first phase winding having windings located in a first plurality of the stator slots and having endturn portions extending beyond the stator core;
   a second phase winding having windings located in a second plurality of stator slots and having endturn portions extending beyond the stator core; and
   a phase separator as recited in claim 1 seated within at least one of the stator slots; and wherein the insulator endturn portions are disposed between the first phase winding endturn portion and the second phase winding endturn portion, wherein the insulator endturn portions electrically insulate the first phase winding endturn from the second phase winding endturn.

8. The stator assembly as recited in claim 7, wherein a portion of the first insulator endturn portion overlaps the second insulator endturn portion.

9. The stator assembly as recited in claim 7, wherein the second insulator is inverted with respect to the first insulator.

10. The stator assembly as recited in claim 7, wherein the endturn portion includes a positioning tab facing the stator core.

11. The stator assembly as recited in claim 7, further including:
    a second a two-piece phase separator having a first insulator and a second insulator, each insulator including:
       a leg portion seated in one of the plurality of stator slots;
       an endturn portion connected to the leg portion, wherein the endturn portion is asymmetric with respect to the leg portion; and
    wherein the insulator endturn portions are disposed between the second phase winding endturn portion and the first winding endturn portion.

12. The stator assembly as recited in claim 7, further including:
    a third phase winding having windings located in a third plurality of stator slots and having endturn portions extending beyond the stator core;
    a second a two-piece phase separator having a first insulator and a second insulator, each insulator including:
       a leg portion seated in one of the plurality of stator slots;
       an endturn portion connected to the leg portion, wherein the endturn portion is asymmetric with respect to the leg portion; and
    wherein the insulator endturn portions are disposed between the second phase winding endturn portion and the third winding endturn portion.

13. The stator assembly as recited in claim 12, further including:
    a third two-piece phase separator having a first insulator and a second insulator, each insulator including:
       a leg portion seated in one of the plurality of stator slots; and
       an endturn portion connected to the leg portion, wherein the endturn portion is asymmetric with respect to the leg portion; and
    wherein the insulator endturn portions are disposed between endturn portions of the third windings and endturn portions of the second windings.

14. The phase separator as recited in claim 1, wherein each insulator includes only two leg portions.

15. The phase separator as recited in claim 1, wherein the insulator axis extends longitudinally along a length of the leg portion and intersects the end portions and the leg portion.

16. The phase separator as recited in claim 1, wherein the insulator has only one stator tooth slot.

* * * * *